June 19, 1951          J. H. SCHLESINGER          2,557,917
DISPENSER HAVING A RESILIENT WALL DIAPHRAGM FLOW CONTROLLER,
ACTUATED BY A RECIPROCATING DISPENSING NOZZLE
Filed Aug. 11, 1945          2 Sheets—Sheet 1
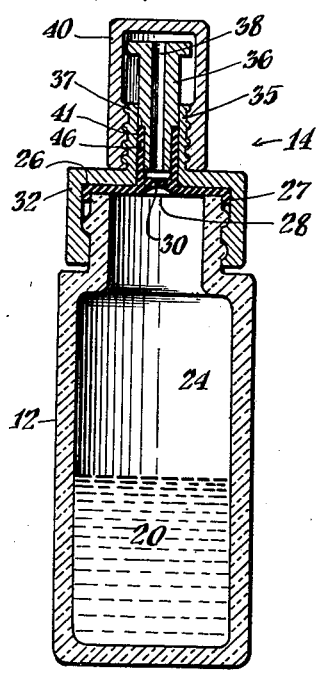
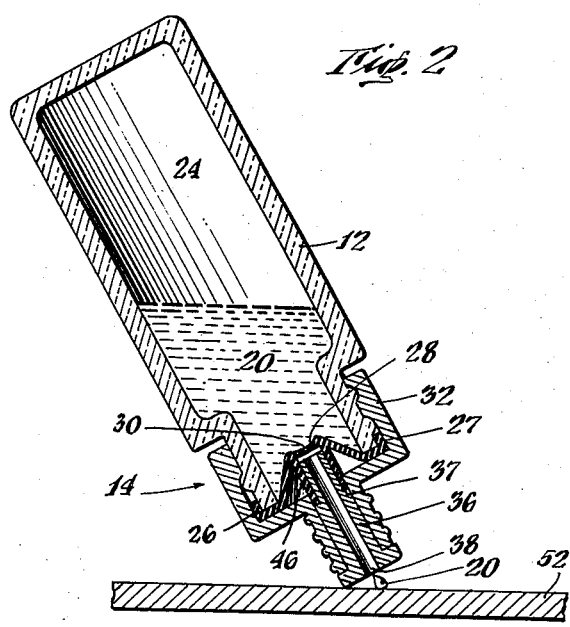
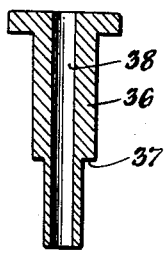
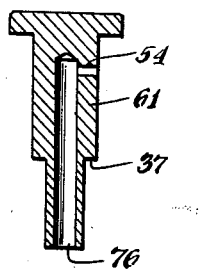
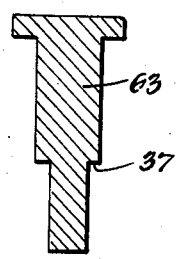
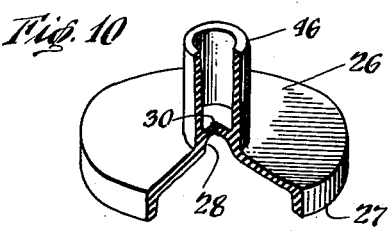
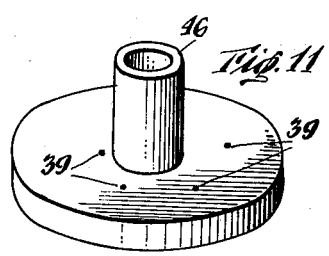
INVENTOR
Joseph H. Schlesinger
BY Robert Calvert
ATTORNEY June 19, 1951 J. H. SCHLESINGER 2,557,917
DISPENSER HAVING A RESILIENT WALL DIAPHRAGM FLOW CONTROLLER,
ACTUATED BY A RECIPROCATING DISPENSING NOZZLE
Filed Aug. 11, 1945 2 Sheets-Sheet 2
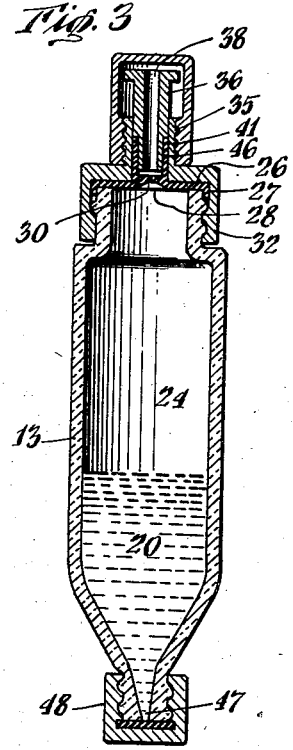
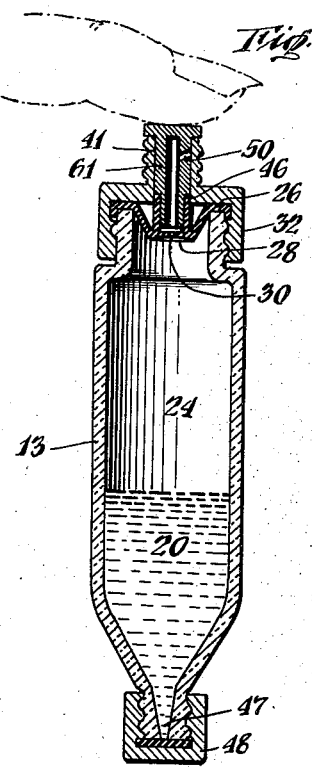
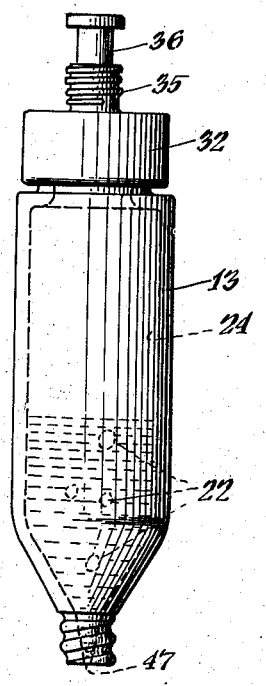
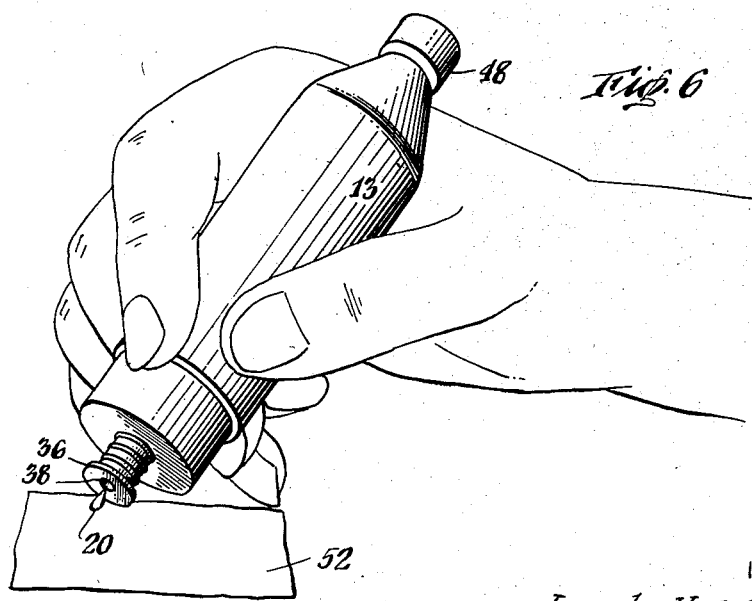
INVENTOR
Joseph H. Schlesinger
BY
Robert Calnek
ATTORNEY

Patented June 19, 1951

2,557,917

UNITED STATES PATENT OFFICE 2,557,917

DISPENSER HAVING A RESILIENT WALL DIAPHRAGM FLOW CONTROLLER, ACTUATED BY A RECIPROCATING DISPENSING NOZZLE

Joseph H. Schlesinger, New York, N. Y., assignor to Eagle Chemical Company, New York, N. Y.

Application August 11, 1945, Serial No. 610,244

3 Claims. (Cl. 222—212)

This invention relates to a dispensing closure for controllably dispensing liquid or gas when attached to a container.

The invention is particularly useful in connection with delivering drops or other small portions of antiseptics, medicinals, perfumes, chemicals and the like.

The invention will be illustrated, therefore, by description in connection with the dispensing of such liquids.

When so used, my closure prevents evaporation and spilling of the liquid, keeps the liquid sealed in the container when not in use, and controls air pressure within the container and, thereby, controls the flow of the liquid being dispensed. The dispensing closure or stopper is positive and dependable in its action, attractive in appearance, and compact in size.

Briefly stated the invention comprises a dispensing closure cap including a punctured resilient diaphragm that closes the normally open mouth of a container, a plunger, and means securing the plunger movably on the side of the diaphragm away from the container, the plunger being preferably hollow, and the hole in the plunger being in communication with the said puncture. As the plunger is pressed towards the diaphragm, in this structure, the diaphragm is flexed to become enlarged, the puncture opened, and the contents of the container expelled in part through the opened puncture and through the hole in the hollow plunger. In another embodiment, the invention comprises the combination of the dispensing closure with the container. In a modification, the invention includes the combination of the stopper with a container which, at its end remote from the stopper, is provided with an orifice and suitably is closed at this other end of the container, when the container is not in operative position for dispensing liquid.

The invention will be further illustrated by description in connection with the attached drawings to which reference is made.

Fig. 1 is a vertical sectional view of a preferred form of the embodiment with a protecting cap disposed over the dispensing closure.

Fig. 2 is a similar view of the assembly with the protecting cap removed and the assembly in the position of delivering a drop of liquid through the dispenser closure.

Fig. 3 is a vertical sectional view showing the dispensing closure on a modified form of container.

Fig. 4 is a view similar to Fig. 3 but with the protecting cap removed from the dispensing stopper and with the diaphragm which extends over the top of the container depressed within the container.

Fig. 5 is a side view of the structure of Fig. 4 after release of pressure on the diaphragm and removal of the cap which in Fig. 4 extends over the lower or delivery end of the special form of container.

Fig. 6 is a perspective view showing the structure of Fig. 4 inverted and in the position of delivering a drop of liquid through the dispensing closure.

Fig. 7 is a vertical sectional view of the plunger element of the dispensing closure, the scale being somewhat enlarged as compared to that used in Figs. 1–6.

Figs. 8 and 9 are similar views of modified forms of plungers.

Fig. 10 is a somewhat enlarged perspective view, partly broken away for clearness of illustration, of the diaphragm element of the assemblies shown in Figs. 1–4.

Fig. 11 is a perspective view of a modified form of diaphragm, the modification consisting in the positioning of the punctures through the base of the diaphragm.

There is shown a rigid container 12 that may be a vial or a bottle with an open end as shown. This end is closed by the dispensing closure means indicated generally at 14. A modified form of container is shown at 13.

Liquid within the container is shown at 20 and there is an air space 24 between the upper surface of the liquid and the end of the container that is the upper at any time.

The dispensing closure cap 14 includes a resilient diaphragm 26 (see Fig. 10 particularly) that has a generally flat base or midportion and a dome shaped formation 28 in the center facing inwardly towards the container. This dome formation performs a triple function.

First, it serves as a suction cup under the diaphragm when pressure is exerted and released from the diaphragm to help to draw and lead the contents to itself and to the puncture. Second, when dispensing liquid downwardly it serves as a receptacle for the accumulation of the liquid to be expelled when the contents of the container near depletion. Finally, the dome shape accelerates opening and closing of the puncture therein as the diaphragm is deformed and stretched and then returned to normal position.

The diaphragm is provided with one or more punctures 39 which are normally closed because of the inherent elasticity or resiliency of the diaphragm material but are open when the diaphragm 26 is depressed, that is, moved within the end portion of the container, say as shown in Figs. 2 and 4. The diaphragm preferably has a flange 27 which fits outside the edge of the mouth of the bottle and is held in position by means of a suitable cap 32. The diaphragm member carries an integral projecting tubular part 46 which contacts a shoulder 37 on the plunger (Fig. 7), the said tubular part being longer than the portion of the plunger below the shoulder and thus preventing direct contact of the plunger with the diaphragm and keeps the plunger outside the opening in the diaphragm, that is, from entering the opening at all times. It will be noted also that the end of the plunger adjacent to the diaphragm is larger in cross section than the opening in the diaphragm even when the diaphragm is stretched. The tubular projection is an integral part of the diaphragm. This integrality prevents possible leakage since there is no joint. The projecting tubular part serves not only to receive the lower end of the plunger and to transmit pressure to the diaphragm but also acts as a delivery channel for fluid. It may serve also as the plunger.

The cap 32 is provided with a tubular guide extension 35 having a smooth inside and threaded outside for the purpose of guiding and maintaining the plunger 36. The threaded outer part is for use in attaching a shielding cap 40 over the exposed part of the plunger.

The smooth inner wall 41 of the tubular extension 35 constitutes a guide extending at a right angle to the base of the diaphragm to serve as a right angular guide for the plunger when exerted against the diaphragm, thereby obtaining immediate direct openings of the puncture in the diaphragm without obstructing the instant free flow of the fluid passing through the delivery channel. Side pressure against the stretchable diaphragm must be prevented as it has a tendency to keep the puncture rather in a stretched closed state, which results in interference with the purpose of the invention.

To obtain the above required results, another important feature is that the plunger is movable within the tubular opening 41. The outer line of the plunger unit being generally parallel to the smooth wall within the tubular opening 41, so as to keep the plunger unit moving at right angle, allowing just enough play for smooth and easy movement of the plunger unit, thus preventing the moving of plunger from side to side and obtaining always a positive right angular pressure when exerted towards and against the stretchable diaphragm.

The hole 38 of the plunger is in free communication and preferably in direct alinement with the puncture 30 in the form of diaphragm shown in Fig. 10.

In the assemblies shown in Figs. 1 and 2, the dispensing closure cap is secured to an ordinary bottle constituting the container 12 and provided with one open end. When put to use, the assembly must be inverted to an angle to contact the liquid with the diaphragm puncture. The plunger is then pressed towards the diaphragm. Liquid from the container then passes through the puncture and through the hole 38 in the plunger 36.

In the modifications shown in Figs. 3–6 the container 13, at the end opposite the improved dispensing closure, is provided with a discharge orifice 47. The other end is suitably covered normally by a protecting guard cap 48 that is removed before use of the assembly.

In this modification, fluid may be dispensed through either end of the container. Liquid may be dispensed through orifice 47 as by depressing the diaphragm, then releasing the diaphragm as by withdrawing the thumb pressure on the plunger, removing the closing cap 48, and then again depressing the plunger.

Liquid may be dispensed through a hollow plunger in an alternative use of the construction shown in Figs. 3–6 and also in the only method of use of the structure of Figs. 1 and 2, by inverting the assembly. Thus an edge of the plunger may be pressed against an object 52 upon which the liquid 20 is to be dispensed.

As shown in Fig. 5, removal of the closing cap 48 after expansion of the diaphragm, as shown in Fig. 4, and then release of pressure on the diaphragm causes an inward entry of air bubbles 22. This entry is due to a partial vacuum within the container, a vacuum that is caused by closing of the puncture 30 in the diaphragm before the diaphragm has returned fully to its normal position such as shown in Fig. 3. This partial vacuum is an important feature in this type of construction as it prevents the premature leakage of liquid from the orifice 47, by depressing the plunger 36 again, the liquid is delivered through the orifice.

The modified form of plunger shown in Fig. 8 is provided with a side outlet 54. This form of plunger may be substituted for that used in any of the assemblies of the Figs. 1–3 and 5.

The solid form of plunger shown in Fig. 9 may be substituted for the plunger 36 or 61 of Figs. 3–5 when the assemblies there shown are not to be used for delivery of liquid through the plunger and when means other than the hole through a hollow plunger are provided for escape of air form the interior of the container.

Such other means for the escape of air are shown in the modified form of diaphragm of Fig. 11. Here the punctures 39 in the diaphragm are spaced outside the tubular upward extension 46 so that, as the punctures are opened by pressure upon the base of the diaphragm, the air from the container may escape directly through the diaphragm to the outer air. It will be understood that the diaphragm of Fig. 11 may be substituted for the diaphragm 26 in the assemblies shown in Figs. 3–5 when the punctures are suitable for permitting escape of gas from the space 24 and subsequent creation of a vacuum and the liquid is to be dispensed through an opening at the other end of the container, as through orifice 47.

Materials of construction may be those that are usual. Thus the container may be of glass, rubber or plastic, transparent material being preferred for the purpose. The caps 32, 40, and 48 and the plungers of Figs. 7–9 may be constructed of plastic, hard rubber, wood or stainless steel.

The diaphragm 26 must be of resilient material. This means that it must be subject to expansion upon the application of a pressing force and contraction to the original state and position after the pressure is released. Rubber is particularly desirable for this diaphragm as it stretches easily and returns to the original condition when the pressure is released. The rubber diaphragm causes the puncture 30 normally to remain sealed and to open to the desired size upon distortion and stretching of the diaphragm.

Examples of materials other than rubber that may be used in the construction of the diaphragm 26 are polymerized chloroprene of rubbery consistency (Duprene) and rubber-like polymers of butadiene and styrene.

The operation of the dispensing closure cap will be evident from the description that has been given. The principle of operation involves:

1. The simultaneous enlargement of the diaphragm and opening of the normally closed puncture, alternating with 2. The simultaneous contraction of the diaphragm and the closing of the opened puncture.

The forced enlargement of the diaphragm applies pressure upon the contents of the container. As the diaphragm is enlarged in size by means of the plunger, the normally closed opening such as a puncture is opened up for the contents to be forced out through the now opened punctures. The size of the enlarged diaphragm displaces a part of the contents, either gas or liquid, from the container.

As the enlarged diaphragm is allowed to contract, by releasing the plunger pressure, the diaphragm and the opened punctures contract and close to their original size and position. Since no outside air has entered the contracted closed punctures and the contracting diaphragm, a partial vacuum results in the space limit occupied by the enlarged diaphragm and the present contracted original position of the now original size diaphragm.

When the liquid in the container is contacted with an opening of the diaphragm, as in Figs. 2 and 6, liquid will be expelled. Naturally, this can only be accomplished by inverting the container, with the diaphragm downward.

A common bottle Fig. 1 makes a suitable and practical container for this method of dispensing liquid.

If the container containing also gaseous matter is held with the dispensing closure cap upward and operated as shown in Fig. 4, the gaseous matter contacting the said openings of the diaphragm will be expelled.

If the dispensing closure cap is attached to a special type container as in Figs. 3-5 having a delivery end 47 and a continuous pressure is kept on the plunger, for keeping open the opening in any of the diaphragm used, a continuous delivery of liquid will be obtained through orifice 47. By releasing pressure from the diaphragm, the opening such as shown in the drawings will close and stop the delivery of liquid.

The dispensing closure described prevents leaking of liquid during standing or storage of the container between uses, prevents change of air over the liquid as the container stands even for a long time, and give a means of delivering controlled quantities of liquid of the order of drops. The dispensing closure may be made of sizes to fit small size bottles to be carried within a lady's handbag for dispensing perfumes and other liquids or to fit large bottles. The assembly with the container is attractive in appearance, certain in its operation, and durable in use.

It will be understood also that it is intended to cover all changes and modifications of the example of the invention herein chosen for the purpose of illustration which do not constitute departures from the spirit and scope of the invention.

What I claim is:

1. A dispenser including a container having an open end and a dispensing stopper closing the said end, the stopper including a resilient diaphragm extending across the said open end, adapted to be depressed at its midportion into the upper part of the container, and provided with an orifice that is normally closed but opens when the diaphragm is depressed, a tubular plunger, means securing the plunger longitudinally movable and adjacent to the diaphragm, the said plunger having a hole in alignment and in direct communication with the said orifice, so that, as the plunger is moved and caused to apply pressure upon the diaphragm, the diaphragm is depressed, the orifice is opened, and the contents of the container placed in communication with the hole in the plunger, and means holding the plunger at all times outside the orifice.

2. A dispensing closure cap for a container having an open rigid end, the closure cap comprising a resilient stretchable diaphragm that extends over and normally closes the said end of the container, the diaphragm being provided in its central portion with a slit that remains closed when the diaphragm is in normal position and that opens when the diaphragm is stretched, a plunger provided with a hole constituting a delivery outlet from the plunger, means mounting the plunger with the hole in communication with the slit and with an end adjacent to the diaphragm so that the plunger is movable under pressure towards the diaphragm, an integral tubular part upstanding from the diaphragm and around the slit, a portion of the plunger extending within the tubular part and provided with a shoulder which contacts the end of the tubular part and prevents movement of the plunger with respect to the said end, so that the plunger, when depressed, applies pressure, through the tubular part, to the diaphragm and stretches the diaphragm but does not itself contact the diaphragm or obstruct the slit.

3. A dispensing closure cap as described in claim 1, the cap including a sleeve extending upwardly from the cap around the plunger and serving as a guide for the plunger.

JOSEPH H. SCHLESINGER.

REFERENCES CITED

The following references are of record in the file of this patent:

UNITED STATES PATENTS

| Number | Name | Date |
| --- | --- | --- |
| 289,447 | Rich | Dec. 4, 1883 |
| 875,697 | Dillard | Jan. 7, 1908 |
| 991,725 | Kennedy | May 9, 1911 |
| 1,060,464 | Langlois | Apr. 29, 1913 |
| 1,326,880 | Rose | Dec. 30, 1919 |
| 1,952,437 | Huber | Mar. 27, 1934 |
| 2,114,583 | Adams | Apr. 19, 1938 |
| 2,245,774 | Gregorek | June 17, 1941 |
| 2,328,863 | Threm | Sept. 7, 1943 |
| 2,446,085 | Gronemeyer | July 27, 1948 |

FOREIGN PATENTS

| Number | Country | Date |
| --- | --- | --- |
| 22,007 | Great Britain | Mar. 9, 1895 |